US008897717B2

(12) United States Patent
Ferguson et al.

(10) Patent No.: US 8,897,717 B2
(45) Date of Patent: Nov. 25, 2014

(54) DUAL-FEED ANTENNA ARRAY WITH INTEGRAL COMPARISON CIRCUIT FOR PHASE AND AMPLITUDE CALIBRATION

(75) Inventors: Paul Ferguson, Redmond, WA (US); Mark Virtue, Kirkland, WA (US); Eduard Shestak, Redmond, WA (US); Ruy C. Brandao, Redmond, WA (US); Pal Meiyappan, Bellevue, WA (US); James Burton Jones, Carnation, WA (US); Jon Riley, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 346 days.

(21) Appl. No.: 12/845,562

(22) Filed: Jul. 28, 2010

(65) Prior Publication Data

US 2012/0028587 A1 Feb. 2, 2012

(51) Int. Cl.
| | |
|---|---|
| H04B 17/00 | (2006.01) |
| H04B 1/00 | (2006.01) |
| H04B 15/00 | (2006.01) |
| H04B 1/04 | (2006.01) |
| H04M 1/00 | (2006.01) |
| H01Q 1/28 | (2006.01) |
| H01Q 21/08 | (2006.01) |
| H01Q 3/26 | (2006.01) |

(52) U.S. Cl.
CPC ........... *H01Q 3/267* (2013.01); *H04B 17/0007* (2013.01); *H04B 17/0062* (2013.01)
USPC ............. 455/67.14; 455/562.1; 455/63.4; 455/129; 342/29; 342/173; 342/174; 343/705; 343/824

(58) Field of Classification Search
USPC ........... 455/67.14, 562.1, 63.4, 129; 342/29, 342/174, 173; 343/705, 824
See application file for complete search history.

(56) References Cited

U.S. PATENT DOCUMENTS

| | | | | |
|---|---|---|---|---|
| 4,532,518 A | * | 7/1985 | Gaglione et al. | ............... 342/372 |
| 5,008,844 A | | 4/1991 | Kyriakos et al. | |

(Continued)

FOREIGN PATENT DOCUMENTS

| | | | | |
|---|---|---|---|---|
| EP | 1143559 A1 | 10/2001 | | |
| EP | 1670095 A1 | 6/2006 | | |
| WO | WO 2009/083961 | * | 7/2009 | ............... H01Q 3/26 |

OTHER PUBLICATIONS

European Search Report from counterpart European patent application No. 11173377.0, dated Oct. 15, 2013, 3 pp.

(Continued)

*Primary Examiner* — Temesgh Ghebretinsae
*Assistant Examiner* — Devan Sandiford
(74) *Attorney, Agent, or Firm* — Shumaker & Sieffert, P.A.

(57) ABSTRACT

A two-element array antenna system includes a first antenna element and a second antenna element. A transmitting, receiving, and processing (TRP) system is coupled to the first and second antenna elements via, respectively, a single first transmission element and a single second transmission element. The first and second transmission elements have respective transmit-path and receive-path functionality. The TRP system is configured to determine an amplitude offset and phase offset associated with the transmit-path functionality of the first and second transmission elements, and, based on data obtained during the determination of amplitude offset and phase offset associated with the transmit-path functionality of the first and second transmission elements, determine an amplitude offset and phase offset associated with the receive-path functionality of the first and second transmission elements.

16 Claims, 3 Drawing Sheets

(56) References Cited

U.S. PATENT DOCUMENTS

| | | | |
|---|---|---|---|
| 5,889,491 A | 3/1999 | Minter | |
| 6,104,935 A * | 8/2000 | Smith et al. | 455/562.1 |
| 6,339,399 B1 * | 1/2002 | Andersson et al. | 342/372 |
| 7,583,223 B2 | 9/2009 | Brandao et al. | |
| 2006/0170575 A1 * | 8/2006 | Jang et al. | 341/120 |
| 2006/0273959 A1 | 12/2006 | Kawasaki | |
| 2007/0247363 A1 | 10/2007 | Piesinger | |
| 2008/0012748 A1 | 1/2008 | Ahn | |
| 2008/0150832 A1 * | 6/2008 | Ingram et al. | 343/893 |
| 2009/0027258 A1 | 1/2009 | Slayton | |

OTHER PUBLICATIONS

Examination Report from counterpart European patent application No. 11173377.0, dated Oct. 28, 2013, 9 pp.

* cited by examiner

DUAL-FEED ANTENNA ARRAY WITH INTEGRAL COMPARISON CIRCUIT FOR PHASE AND AMPLITUDE CALIBRATION

BACKGROUND OF THE INVENTION

Antennas comprised of multiple radiating elements arranged as arrays are used in many applications where it is necessary to electronically steer the antenna's radiating pattern (beam). They are also used in applications that derive the direction from which a signal arrives by measuring the relative amplitudes and phase angles between each of the antenna elements for a given received signal. For each of these types of applications it is necessary to know about any system induced phase and amplitude offsets and errors between each element so that they can be removed from received signal measurements and compensated for in transmit signal generation. The process of determining the system induced phase and amplitude offsets and errors is referred to as calibration of the system.

Calibration can be accomplished as a one-time measurement in a lab or at an installation site or it can be a periodic process to eliminate variation over time due to the environmental effects of temperature, altitude, humidity, etc. When periodic calibration is required, it is generally provided for as a built-in function of the system itself and requires no external support. This process is called self calibration. Self calibration is common in airborne applications where extreme environmental variations exist as well as highly limited access to the systems during use.

The Traffic Collision Avoidance System (TCAS) is one such system that utilizes a multi-element antenna to steer the beam during transmit and to determine angle of signal arrival during receive. Typical TCAS systems use a 4-element antenna with each element having a dedicated signal feed point. The following is a brief description of how a 4-feed antenna system is calibrated. Since each element is mutually coupled to each other element and since the electrical distance between the elements is known based on the physical spacing of the elements, the phase and amplitude offsets and/or errors for each element can be determined by measuring the complex transfer function (i.e. the insertion phase and amplitude) between different pairs of elements and using the results of these measurements to calculate all of the relative offsets and/or errors in the system. This technique will work with any number of elements greater than or equal to three since it relies on differential measurements of phase and amplitude between one element and any two other elements.

New systems are being developed that will use antennas with only two elements, thus eliminating the possibility of using the calibration method described above.

For example, commonly owned U.S. Pat. No. 7,583,223, which is hereby incorporated by reference as if fully set forth herein, discloses a system that includes a first antenna and a second antenna located on a top surface of an aircraft, spaced apart along a first axis, as well as a third antenna and a fourth antenna located on a bottom surface of the aircraft, spaced apart along a second axis orthogonal to the first axis. The system also includes a transmitting, receiving, and processing system coupled to the first, second, third, and fourth antennas, wherein the transmitting, receiving, and processing system is configured to transmit TCAS interrogations, receive TCAS replies, and process the TCAS replies to determine the relative bearing of a second aircraft from the first aircraft. Such a system provides a TCAS antenna system, employing two pairs of two-element arrays, that uses less cabling than previous attempts, specifically, four cables (two to top and two to bottom) instead of eight cables (four to top and four to bottom).

Commonly owned U.S. Pat. No. 4,855,748 discloses an approach by which cables associated with four-element antenna arrays may be phase calibrated. However, as above alluded to, such approach cannot be employed for phase calibration of the above-described two-element arrays.

SUMMARY OF THE INVENTION

In an embodiment, a two-element array antenna system includes a first antenna element and a second antenna element. A transmitting, receiving, and processing (TRP) system is coupled to the first and second antenna elements via, respectively, a single first transmission element and a single second transmission element. The first and second transmission elements have respective transmit-path and receive-path functionality. The TRP system is configured to determine an amplitude offset and phase offset associated with the transmit-path functionality of the first and second transmission elements, and, based on data obtained during the determination of amplitude offset and phase offset associated with the transmit-path functionality of the first and second transmission elements, determine an amplitude offset and phase offset associated with the receive-path functionality of the first and second transmission elements.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment of the invention provides an approach that solves the problem of calibrating a system that uses only two external signal connections, typically coaxial (dual feed), to two or more antenna elements. An embodiment provides to the dual-feed antenna system a method and apparatus of sampling the signals at each of the antenna elements and then using a nulling technique to determine the relative amplitude and phase differences between the two transmit signal paths. The information gained during the nulling process is then applied to allow measurement of the offsets in the receiver signal paths. In this way both the transmit beam direction and the receive angle of arrival can be properly compensated.

A calibration technique according to an embodiment includes sampling (e.g., coupling at a low coupling ratio) the transmit signals from each of the antenna elements, combining the sampled signals, and then passing the resultant signal into an amplitude detector circuit. Phase coherent signals are sent to each of the antenna elements simultaneously. Each of the signals is coupled into a combiner circuit. Since the two signals are phase-coherent and at the same frequency they will combine vectorially resulting in a composite radio-frequency (RF) signal, the amplitude of which is the vector sum of the inputs. The combiner then passes the resultant composite signal to an amplitude detector circuit. The detector circuit converts the composite RF signal into a direct-current (DC) signal, the voltage of which is proportional to the amplitude of the composite RF signal. The DC signal is then coupled onto one or both of the antenna feed lines, typically coaxial cables, and passed to the transmitter/receiver unit where its amplitude can be read.

Thus, if the phase and amplitude of one or both of the input signals is varied until the detected vector sum is minimized (nulled), then the transmit signals are known to be equal in amplitude and 180 degrees out of phase at the combiner input. This condition along with the phase and amplitude settings required to achieve the null condition provide the transmit phase and amplitude calibration constants for the system. The receive-path calibration constants are then measured by sending a transmit signal (at the phase and amplitude settings determined during transmit-path calibration) to one of the elements, and the phase and amplitude of the signal received by the second element is measured. This measurement is then repeated for the inverse combination of elements.

Figure 1:
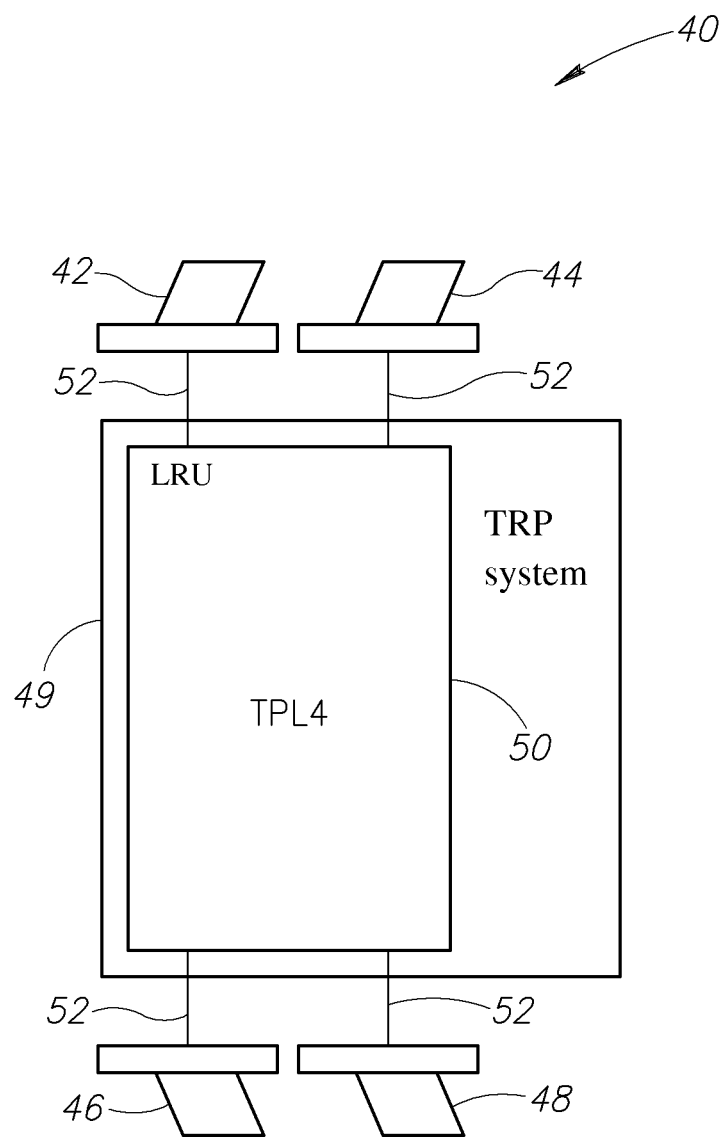
FIG. 1 is a high-level block diagram showing an antenna configuration for a TCAS system in accordance with an embodiment of the invention.

FIG. 1 is a high-level block diagram showing a TCAS system 40 within which an embodiment of the invention may be implemented. The system 40 includes a first top antenna 42, a second top antenna 44, a first bottom antenna 46, and a second bottom antenna 48. Each of the antennas 42, 44, 46, and 48 are connected to a transmitting, receiving, and processing (TRP) system 49 by a transmission element, such as a cable 52, resulting in four total cables 52 for the system 40. The system 49 includes a Line Replaceable Unit (LRU) 50, designated as TPL4 that includes transmitting, receiving, and processing components.

When installed on an aircraft, the first top antenna 42 and the second top antenna 44 are positioned on a top surface of the aircraft, spaced apart along a first axis while the first bottom antenna 46 and the second bottom antenna 48 are positioned on a bottom surface of the aircraft, spaced apart along a second axis orthogonal to the first axis. In an example embodiment, the antennas 42, 44, 46, 48 are L-band blade antennas. In one example, an L-band blade antenna is any single element L-band antenna suitable for transponder or DME applications, and may be a simple, standard matched-quarter-wave stub antenna.

Figure 2:
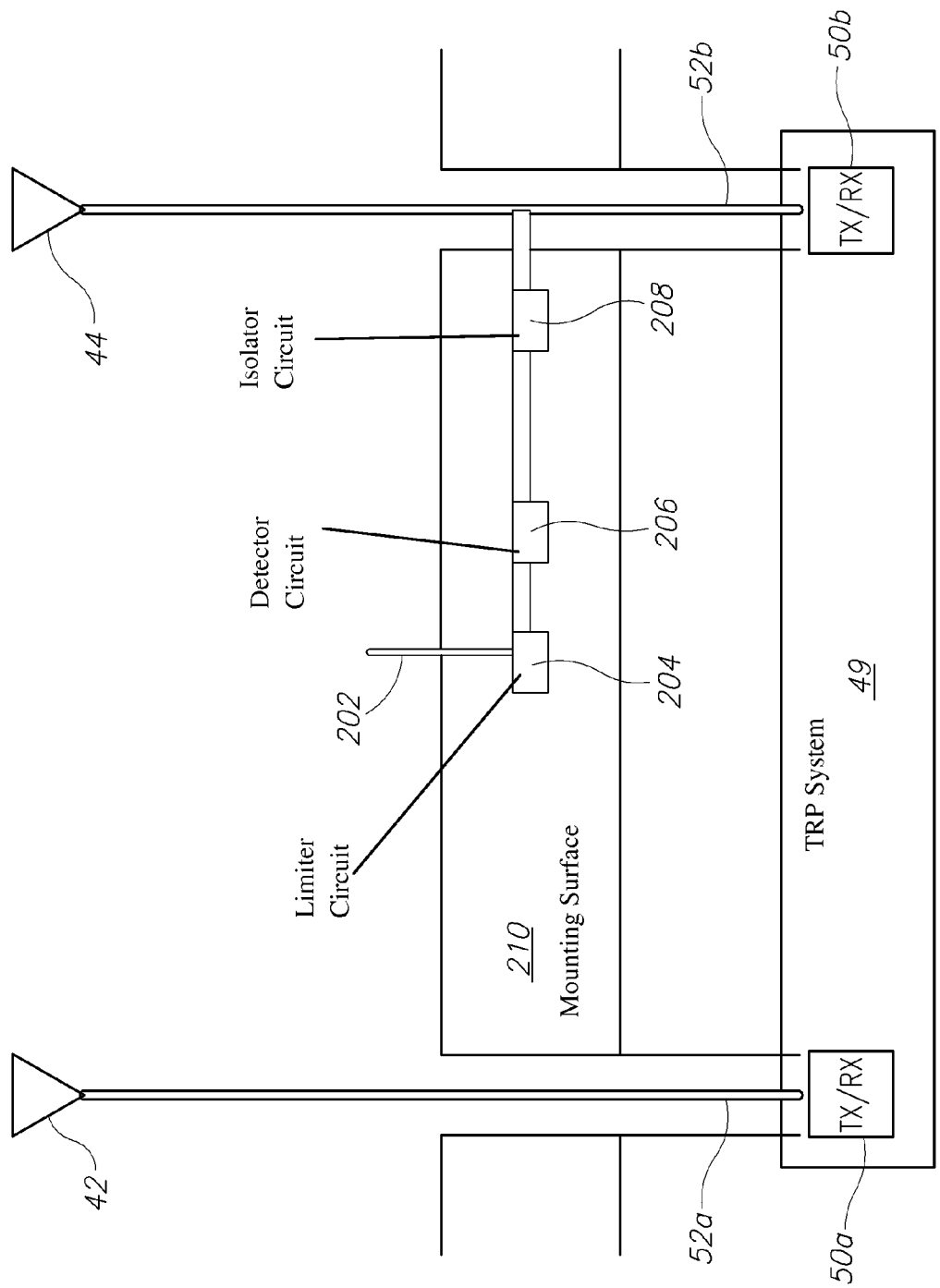
FIG. 2 is a high-level block diagram showing a two-element array antenna configuration in accordance with an embodiment of the invention.

Referring now to FIG. 2, illustrated is a calibration approach for a two-element array according to an embodiment of the invention. It should be understood that the following discussion of calibration techniques employed by varying embodiments of the invention applies to antenna arrays including no more or fewer than two antenna elements. In the illustrated embodiment, antenna elements 42, 44 are respectively coupled to the TRP system 49 by single coaxial cables 52a, 52b. As illustrated, the TRP system 49 may include one or more LRUs 50a, 50b coupled to cables 52a, 52b.

An embodiment further includes a sampling element, such as an RF probe coupler 202, a limiter circuit 204, a detector circuit 206, which includes signal-conversion functionality as will be explained in greater detail, and a DC coupling/RF isolation circuit 208. Each of these elements may be positioned on an aircraft mounting surface 210, which may be enclosed within a housing (not shown) on the exterior of the aircraft.

The probe coupler 202 may include any structure that, due to its proximity to the radiating antenna elements 42, 44, is electromagnetically coupled to the antenna elements. A short wire, printed dipole or patch, and loop are examples of the type of structure that can be utilized for the probe coupler 202.

Detector circuit 206 may include a rectifying junction, such as a diode followed by a low-pass filter (not shown). The diode may be a Schottky barrier diode, and the low-pass filter may be a series resistor and shunt capacitor. The DC coupling/RF isolation circuit 208 may include at least one low-pass filter.

In operation, when transmit-path calibration of cables 52a, 52b is desired, the TRP system 49 is configured to transmit at least one first calibration signal to antenna element 42 and at least one second calibration signal to antenna element 44. These calibration signals may be respectively generated by LRUs 50a, 50b or by a single one of LRUs 50a, 50b. The first and second calibration signals are phase-coherent and of the same frequency. However, as alluded to above, one of the first and second calibration signals is varied in amplitude and phase from the other calibration signal.

The probe coupler 202 samples first and second transmit signals based on the first and second calibration signals and generated, respectively, by the antenna elements 42, 44. In the embodiment illustrated in FIG. 2, the probe coupler 202 is configured to combine the sampled first and second transmit signals into a composite RF signal. This ability of the probe coupler 202 to combine the sampled signals can be a consequence of its simultaneous electromagnetic coupling to antenna elements 42, 44. The composite signal is passed to the detector circuit 206 by the limiter circuit 204, which functions to protect the detector circuit from damage due to high signal levels during normal system operation. The detector circuit 206 is configured to convert the amplitude of the composite signal into a DC output signal and pass this output signal to the circuit 208.

The output signal is coupled back by the circuit 208 to the cable 52b. Alternatively, the output signal may be coupled back to both cables 52a, 52b. This coupled output signal travels by the cable 52b to the TRP system 49. The TRP system 49 may measure the amplitude and/or voltage information associated with the output signal.

The TRP system 49 can then determine, based on the output signal, a first amplitude setting and first phase setting of the transmit signals that produce a null voltage of the output signal (i.e., the detected vector sum of the calibration signals is minimized). Subsequently, the TRP system 49 can determine, based on the first amplitude and phase settings, the amplitude offset and phase offset associated with the transmit-path functionality of the cables 52a, 52b.

Figure 3:
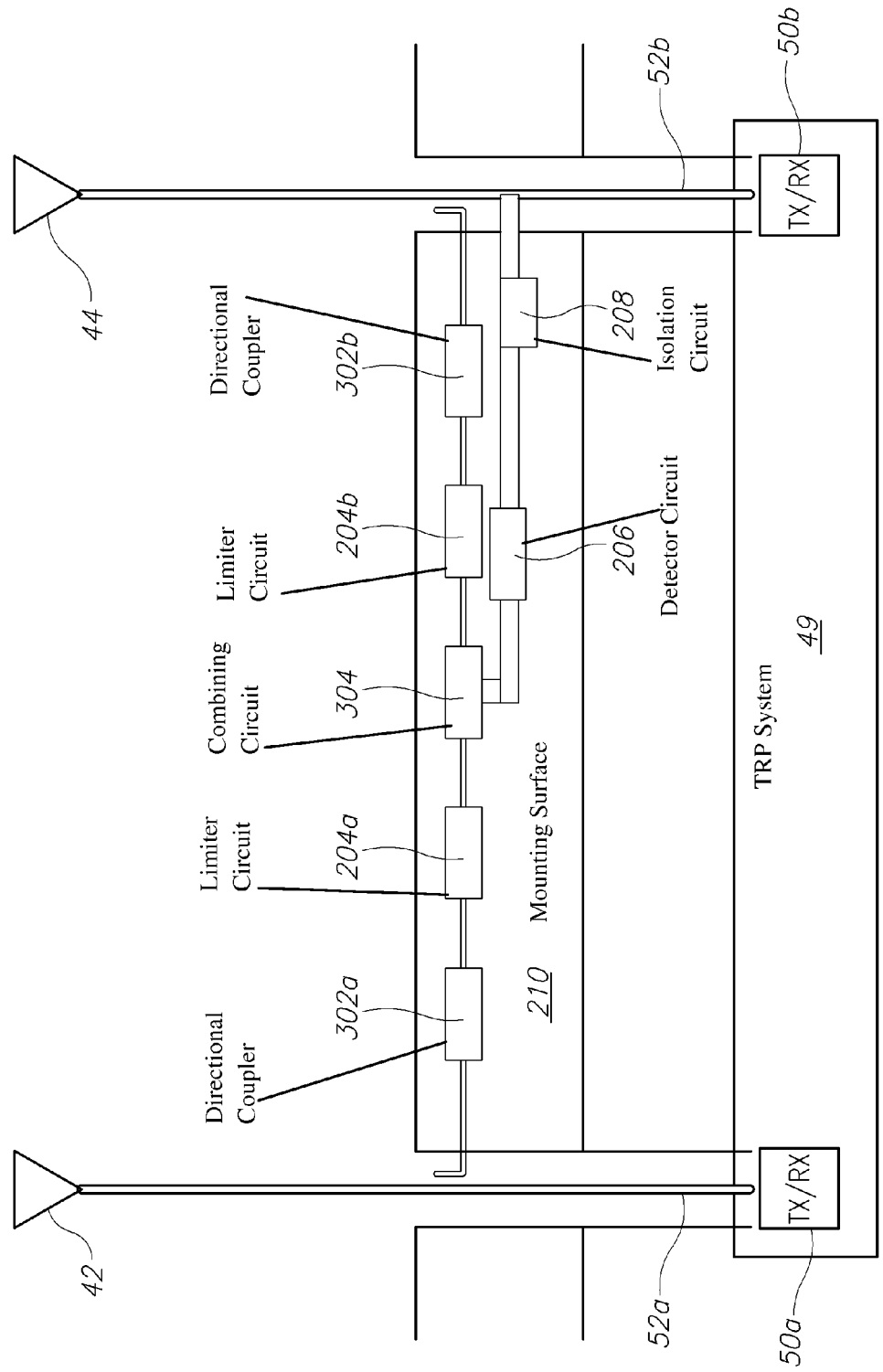
FIG. 3 is a high-level block diagram showing a two-element array antenna configuration in accordance with an alternate embodiment of the invention.

Referring now to FIG. 3, illustrated is a calibration approach for a two-element array according to an alternative embodiment of the invention. In FIG. 3, like elements illustrated in and discussed with reference to FIG. 2 are designated by like reference numerals. In the illustrated embodiment, antenna elements 42, 44 are respectively coupled to the TRP system 49 by single coaxial cables 52a, 52b. As illustrated, the TRP system 49 may include one or more LRUs 50a, 50b coupled to cables 52a, 52b.

An embodiment further includes a sampling element, such as directional couplers 302a, 302b, a pair of limiter circuits 204a, 204b, a combining circuit 304, a detector circuit 206, which includes signal-conversion functionality, and a DC coupling/RF isolation circuit 208. Alternatively, power splitters (not shown) in the feed lines of antenna elements 42, 44, just prior to the element feed points, may be used instead of directional couplers 302a, 302b. Each of these elements may be positioned on an aircraft mounting surface 210, which may be enclosed within a housing (not shown) on the exterior of the aircraft.

The directional couplers 302a, 302b may be implemented in various media, such as printed microstrip or stripline, as well as in coaxial and waveguide transmission lines, electromagnetically coupled to the antenna elements 42, 44. The combining circuit 304 may be implemented as a Wilkinson combiner or other isolated vector combiner in any convenient transmission media.

In operation, when transmit-path calibration of cables 52a, 52b is desired, the TRP system 49 is configured to transmit at least one first calibration signal to antenna element 42 and at least one second calibration signal to antenna element 44. These calibration signals may be respectively generated by LRUs 50a, 50b or by a single one of LRUs 50a, 50b.

The directional couplers 302a, 302b sample first and second transmit signals based on the first and second calibration signals and generated, respectively, by the antenna elements 42, 44. In the embodiment illustrated in FIG. 3, the combining circuit 304 is configured to combine the sampled first and second transmit signals into a composite RF signal. The composite signal is then passed to the detector circuit 206. The detector circuit 206 is configured to convert the composite signal into a DC output signal and pass this output signal to the circuit 208.

The output signal is coupled back by the circuit 208 to the cable 52b. Alternatively, the output signal may be coupled back to both cables 52a, 52b. This coupled output signal travels by the cable 52b to the TRP system 49. The TRP system 49 may measure the phase, amplitude and/or voltage information associated with the output signal.

The TRP system 49 can then determine, based on the output signal, a first amplitude setting and first phase setting (i.e., transmit phase and amplitude calibration constants) of the antenna elements 42, 44 that produce a null voltage of the output signal (i.e., the detected vector sum of the calibration signals is minimized). Subsequently, the TRP system 49 can determine, based on the transmit phase and amplitude calibration constants, the amplitude offset and phase offset associated with the transmit-path functionality of the cables 52a, 52b.

Regardless of which of the embodiments illustrated in FIGS. 2 and 3 is employed, the TRP system 49 can subsequently determine the amplitude offset and phase offset associated with the receive-path functionality of the cables 52a, 52b. Specifically, and for example, the TRP system 49 transmits to antenna element 42 a third calibration signal set at the transmit phase and amplitude calibration constants. The TRP system 49 receives from the antenna element 44 a second output signal based on the third calibration signal. Subsequently, the TRP system 49 transmits to antenna element 44 a fourth calibration signal set at the transmit phase and amplitude calibration constants. The TRP system 49 receives from the antenna element 42 a third output signal based on the fourth calibration signal. Consequently, by measuring the respective phases and amplitudes of the second and third output signals, the TRP system 49 is able to determine the amplitude offset and phase offset associated with the receive-path functionality of the first and second transmission elements 52a, 52b.

While the preferred embodiment of the invention has been illustrated and described, as noted above, many changes can be made without departing from the spirit and scope of the invention. For example, rather than using L-band blade antennas, L-band antennas integrated into skin surfaces of an aircraft could be used in some embodiments. Additionally, a top two-element antenna and a bottom two-element antenna are used in some embodiments, with the first antenna being replaced by the first element of the top two-element antenna, the second antenna being replaced by the second element of the top two-element antenna, the third antenna being replaced by the first element of the bottom two-element antenna, and the fourth antenna being replaced by the second element of the bottom two-element antenna. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A two-element array antenna system, comprising:
   only a first antenna element and a second antenna element;
   a transmitting, receiving, and processing (TRP) system coupled to the first and second antenna elements, the TRP system being coupled to the first antenna element via a single first transmission element, the TRP system being coupled to the second antenna element via a single second transmission element, the first and second transmission elements having respective transmit-path and receive-path functionality; and
   a first circuit comprising a sampling element, the sampling element comprising one or more directional couplers electromagnetically coupled to the first transmission element and the second transmission element, the sampling element being configured to sample a first transmit signal from the first antenna element and a second transmit signal from the second antenna element, the first circuit further being configured to generate a first output signal based at least in part on the first transmit signal and the second transmit signal,
   wherein the TRP system is configured to:
      receive, via at least one of the first transmission element and the second transmission element of the TRP system, the first output signal;
      determine, based on the first output signal, an amplitude offset and phase offset associated with the transmit-path functionality of the first and second transmission elements, and
      based on data obtained during the determination of amplitude offset and phase offset associated with the transmit-path functionality of the first and second transmission elements, determine an amplitude offset and phase offset associated with the receive-path functionality of the first and second transmission elements.

2. The system of claim 1, wherein the TRP system is further configured to:
   determine, based on the first output signal, a first amplitude setting and first phase setting of the first and second antenna elements that produce a null voltage of the first output signal; and
   determine, based on the determined first amplitude and phase settings, the amplitude offset and phase offset associated with the transmit-path functionality of the first and second transmission elements.

3. The system of claim 2, wherein the TRP system is further configured to:
   transmit to the first antenna element a calibration signal based on the determined amplitude and the first phase setting.

4. The system of claim 2, wherein the first circuit is coupled to at least one of the first and second antenna elements.

5. The system of claim 4, wherein the first circuit further comprises:
   a combining element configured to combine the sampled first and second transmit signals into a composite RF signal; and a converter element configured to convert the composite signal into a DC signal, wherein the first output signal comprises the DC signal.

6. The system of claim 4, wherein the first circuit further comprises:
a converter element configured to convert the composite signal into a DC signal, wherein the first output signal comprises the DC signal.

7. The system of claim 6, wherein the sampling element comprises a probe element electromagnetically coupled to the first and second antenna elements.

8. A two-element array antenna system, comprising:
only a first antenna element and a second antenna element;
a transmitting, receiving, and processing (TRP) system coupled to the first and second antenna elements, the TRP system being coupled to the first antenna element via a single first transmission element, the TRP system being coupled to the second antenna element via a single second transmission element, the first and second transmission elements having respective transmit-path and receive-path functionality; and
a first circuit coupled to at least one of the first and second antenna elements, the first circuit configured to generate a first output signal, wherein the first circuit comprises:
a sampling element comprising one or more directional couplers electromagnetically coupled to the first and second transmission elements, the sampling element being configured to sample a first transmit signal generated by the first antenna element, and sample a second transmit signal generated by the second antenna element;
a combining element configured to combine the sampled first and second transmit signals into a composite radio frequency (RF) signal; and
a converter element configured to convert the composite signal into a DC signal, wherein the first output signal comprises the DC signal,
wherein the TRP system is configured to:
receive, via the at least one of the first and second transmission elements, the first output signal;
determine, based on the first output signal, a first amplitude setting and a first phase setting of the first and second antenna elements that produce a null voltage of the first output signal;
determine, based on the determined first amplitude and phase settings, an amplitude offset and a phase offset associated with the transmit-path functionality of the first and second transmission elements; and
determine, based on data obtained during the determination of the amplitude offset and the phase offset associated with the transmit-path functionality of the first and second transmission elements, an amplitude offset and a phase offset associated with the receive-path functionality of the first and second transmission elements.

9. The system of claim 8, wherein the combining element comprises at least one Wilkinson combiner.

10. The system of claim 8, wherein the converter element comprises a diode and a low-pass filter.

11. The system of claim 6, wherein the converter element comprises a diode and a low-pass filter.

12. A method comprising:
sampling, with a sampling element comprising one or more directional couplers electromagnetically coupled to a first transmission element and a second transmission element of a transmitting, receiving, and processing (TRP) system, a first transmit signal from a first antenna element and a second transmit signal from a second antenna element, wherein the TRP system is coupled to a two-element array antenna system including only the first antenna element and the second antenna element, wherein the TRP system is coupled to the first antenna element via the single first transmission element, and the TRP system is coupled to the second antenna element via the single second transmission element, the first and second transmission elements each having a respective transmit-path functionality;
generating a first output signal based at least in part on the first transmit signal and the second transmit signal;
receiving, via at least one of the first transmission element and the second transmission element of the TRP system, the first output signal;
determining, based on the first output signal, a first amplitude setting and a first phase setting of the first and second antenna elements that produce a null voltage of the first output signal; and
determining, based on the determined first amplitude setting and the determined first phase setting of the first and second antenna elements, an amplitude offset and phase offset associated with the transmit-path functionality of the first and second transmission elements.

13. The method of claim 12, further comprising:
transmitting to the first antenna element a calibration signal based on the determined amplitude offset and the phase offset.

14. The method of claim 12, wherein generating the first output signal based at least in part on the first transmit signal and the second transmit signal comprises:
combining the sampled first and second transmit signals into a composite RF signal; and
converting the composite signal into a DC signal, wherein the first output signal comprises the DC signal.

15. The method of claim 12, wherein the first and second transmission elements each have a respective receive-path functionality, the method further comprising:
determining, based on data obtained during the determination of the amplitude offset and the phase offset associated with the transmit-path functionality of the first and second transmission elements, an amplitude offset and a phase offset associated with the receive-path functionality of the first and second transmission elements.

16. The method of claim 12, further comprising:
generating, with the first antenna element, the first transmit signal;
generating, with the second antenna element, the second transmit signal;
wherein generating the first output signal based at least in part on the first transmit signal and the second transmit signal comprises:
generating a composite radio frequency (RF) signal based at least in part on the first transmit signal and the second transmit signal; and
generating a DC signal based at least in part on the composite RF signal, wherein the first output signal comprises the DC signal.

* * * * *